US012657618B2

(12) United States Patent
Fan et al.

(10) Patent No.: US 12,657,618 B2
(45) Date of Patent: Jun. 16, 2026

(54) SYSTEMS AND METHODS FOR UNIVERSAL ITEM LEARNING IN ITEM RECOMMENDATION

(71) Applicant: Salesforce, Inc., San Francisco, CA (US)

(72) Inventors: Ziwei Fan, Chicago, IL (US); Yongjun Chen, Palo Alto, CA (US); Zhiwei Liu, Palo Alto, CA (US); Huan Wang, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 651 days.

(21) Appl. No.: 18/182,944

(22) Filed: Mar. 13, 2023

(65) Prior Publication Data

US 2024/0046330 A1     Feb. 8, 2024

Related U.S. Application Data

(60) Provisional application No. 63/481,372, filed on Jan. 24, 2023, provisional application No. 63/395,709, filed on Aug. 5, 2022.

(51) Int. Cl.
*G06Q 30/0601* (2023.01)
*G06Q 30/0201* (2023.01)

(52) U.S. Cl.
CPC ..... *G06Q 30/0631* (2013.01); *G06Q 30/0201* (2013.01)

(58) Field of Classification Search
CPC ...................... G06Q 30/0631; G06Q 30/0201
See application file for complete search history.

(56) References Cited

U.S. PATENT DOCUMENTS

| | | | |
|---|---|---|---|
| 2021/0027178 A1* | 1/2021 | Ding | G06N 3/092 |
| 2021/0233124 A1* | 7/2021 | Rahman | G06Q 30/0282 |
| 2021/0241343 A1* | 8/2021 | Arora | G06Q 30/0633 |
| 2022/0207587 A1* | 6/2022 | Yang | G06N 3/08 |
| 2023/0206076 A1* | 6/2023 | Xu | G06N 3/096 |
| | | | 706/15 |
| 2023/0229859 A1* | 7/2023 | Khandelwal | G06F 40/279 |
| 2023/0267317 A1* | 8/2023 | Shin | G06N 3/084 |
| | | | 706/17 |
| 2024/0289823 A1* | 8/2024 | Wu | G06Q 30/0202 |

* cited by examiner

*Primary Examiner* — Khanh B Pham

(74) *Attorney, Agent, or Firm* — Haynes and Boone, LLP

(57) ABSTRACT

Embodiments described herein provide a universal item learning framework that generates universal item embeddings for zero-shot items. Specifically, the universal item learning framework performs generic features extraction of items and product knowledge characterization based on a product knowledge graph (PKG) to generate embeddings of input items. A pretrained language model (PLM) may be adopted to extract features from generic item side information, such as titles, descriptions, etc., of an item. A PKG may be constructed to represent recommendation-oriented knowledge, which comprise a plurality of nodes representing items and a plurality of edges connecting nodes representing different relations between items. As those relations in PKG are usually retrieved from user-item interactions, the PKG adapts the universal representation for recommendation with knowledge of user-item interactions.

20 Claims, 10 Drawing Sheets

Step 2: Fine-tuning on Recommendation 300

FIG. 3

Inference 400

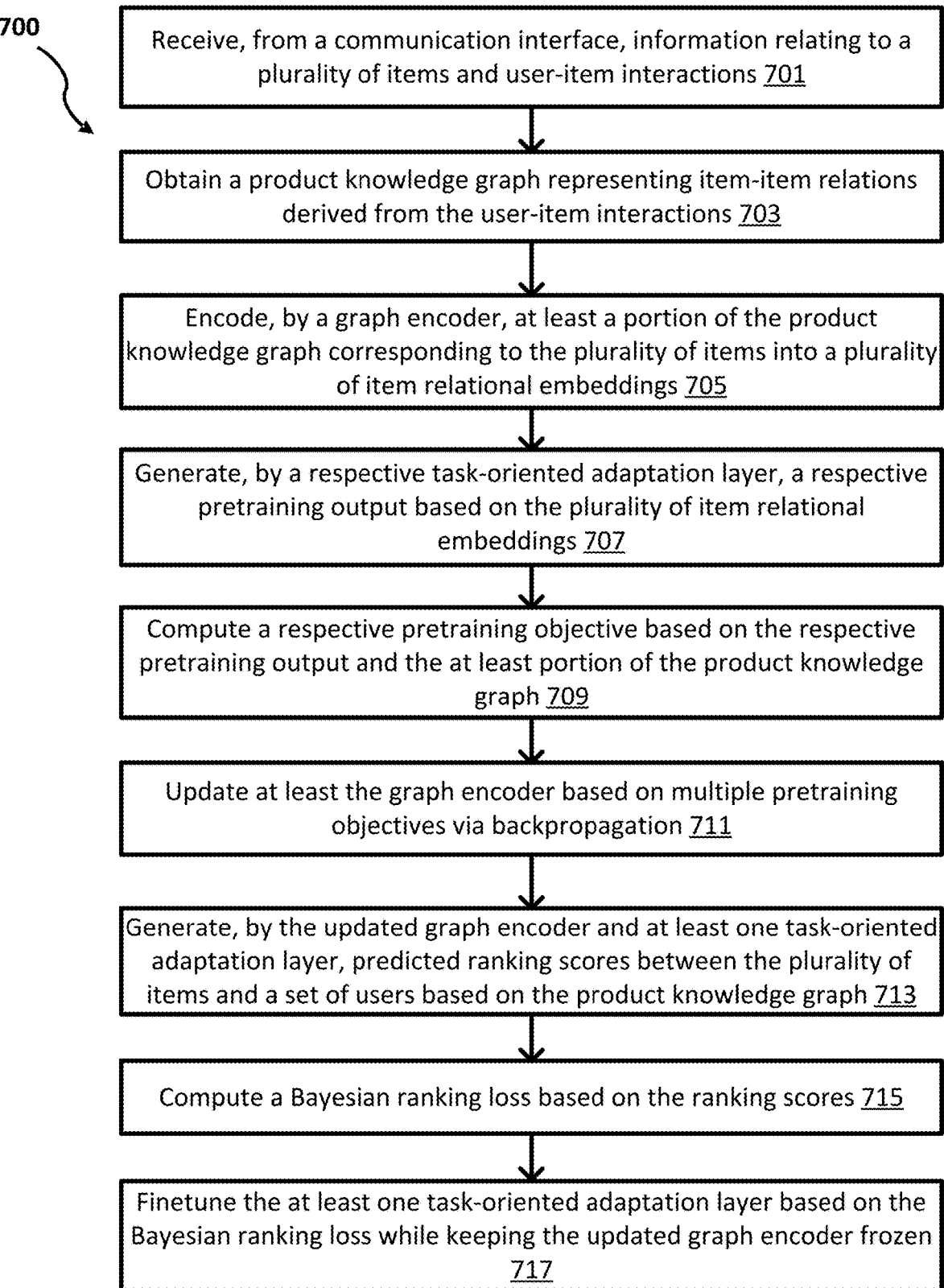

Receive, from a communication interface, information relating to a plurality of items and user-item interactions 701

Obtain a product knowledge graph representing item-item relations derived from the user-item interactions 703

Encode, by a graph encoder, at least a portion of the product knowledge graph corresponding to the plurality of items into a plurality of item relational embeddings 705

Generate, by a respective task-oriented adaptation layer, a respective pretraining output based on the plurality of item relational embeddings 707

Compute a respective pretraining objective based on the respective pretraining output and the at least portion of the product knowledge graph 709

Update at least the graph encoder based on multiple pretraining objectives via backpropagation 711

Generate, by the updated graph encoder and at least one task-oriented adaptation layer, predicted ranking scores between the plurality of items and a set of users based on the product knowledge graph 713

Compute a Bayesian ranking loss based on the ranking scores 715

Finetune the at least one task-oriented adaptation layer based on the Bayesian ranking loss while keeping the updated graph encoder frozen 717

FIG. 7

| Brazil(br) | Japan(jp) | Mexico(mx) | Italian(it) | France(fr) | Spain(es) |
|---|---|---|---|---|---|
| 1.7K/60K/10.5K | 1.9K/5.6K/14K | 3.5K/7K/16K | 3.7K/11K/20K | 5.7K/16K/38K | 5.9K/10K/29K |
| Australia(au) | Germany(de) | India(in) | Canada(ca) | United States(us) | United Kingdom(uk) |
| 13K/27.6K/121K | 18K/31K/122K | 22K/20K/114K | 30K/38K/208K | 1.7K/8K/8K | 251K/66K/1.8M |

FIG. 8

Table 2: Product Knowledge Graph Statistics.

| Edge Type | alsoBought | alsoViewed | boughtTogether | Total |
|---|---|---|---|---|
| #of items/#of edges | 93,659/2,044,418 | 86,481/1,048,779 | 64,574/115,386 | 97,626/3,208,583 |

FIG. 9

Table 3: ZSIR Task Results on All Items Comparison. The best models are bolded and the second-best are underlined.

| Model | NDCG@20 | | | | | | | MRR | | | | | | |
|---|---|---|---|---|---|---|---|---|---|---|---|---|---|---|
| | br | mx | es | in | ca | uk | us | br | mx | es | in | ca | uk | us |
| TransE | 0.0357 | 0.0250 | 0.0196 | 0.0153 | 0.0149 | 0.0126 | 0.0166 | 0.0298 | 0.0186 | 0.0163 | 0.0121 | 0.0100 | 0.0080 | 0.0102 |
| TransD | 0.0345 | 0.0251 | 0.0189 | 0.0157 | 0.0148 | 0.0127 | 0.0159 | 0.0275 | 0.0199 | 0.0153 | 0.0117 | 0.0103 | 0.0080 | 0.0103 |
| TransH | 0.0393 | 0.0289 | 0.0208 | 0.0164 | 0.0160 | 0.0129 | 0.0197 | 0.0317 | 0.0229 | 0.0187 | 0.0143 | 0.0107 | 0.0083 | 0.0126 |
| DistMult | 0.0344 | 0.0233 | 0.0202 | 0.0159 | 0.0168 | 0.0125 | 0.0155 | 0.0253 | 0.0207 | 0.0195 | 0.0129 | 0.0111 | 0.0075 | 0.0088 |
| GPT-GNN | 0.0397 | 0.0304 | 0.022 | 0.0182 | 0.0174 | 0.0140 | 0.0210 | 0.0329 | 0.0242 | 0.0251 | 0.0169 | 0.0113 | 0.0096 | 0.0159 |
| HeCo | 0.0384 | 0.0285 | 0.0222 | 0.0175 | 0.0175 | 0.0132 | 0.0217 | 0.0323 | 0.0246 | 0.0234 | 0.0156 | 0.0125 | 0.0090 | 0.0157 |
| MPKG | 0.0542 | 0.0433 | 0.0407 | 0.0243 | 0.0204 | 0.0162 | 0.0257 | 0.0413 | 0.0332 | 0.0346 | 0.0208 | 0.0166 | 0.0139 | 0.0208 |
| Impro. | 36.52% | 42.43% | 83.33% | 33.52% | 16.57% | 15.71% | 18.43% | 25.53% | 34.96% | 37.85% | 23.08% | 32.8% | 44.79% | 31.65% |

FIG. 10

Table 4: ZSIR Task Results on Zero-Shot Items Comparison. The second-best and the best models are underlined and bolded.

| Model | NDCG@20 | | | | | | | MRR | | | | | | |
|---|---|---|---|---|---|---|---|---|---|---|---|---|---|---|
| | br | mx | es | in | ca | uk | us | br | mx | es | in | ca | uk | us |
| TransE | 0.0467 | 0.0365 | 0.0312 | 0.0206 | 0.0162 | 0.0130 | 0.0215 | 0.0333 | 0.0245 | 0.0216 | 0.0150 | 0.0115 | 0.0096 | 0.0143 |
| TransD | 0.0454 | 0.0332 | 0.0304 | 0.0213 | 0.0175 | 0.0132 | 0.0205 | 0.0313 | 0.0227 | 0.0228 | 0.0130 | 0.0121 | 0.0088 | 0.0144 |
| TransH | 0.0501 | 0.0404 | 0.0312 | 0.0240 | 0.0197 | 0.0152 | 0.0252 | 0.0364 | 0.0280 | 0.0202 | 0.0167 | 0.0114 | 0.0095 | 0.0181 |
| DistMult | 0.0452 | 0.0332 | 0.0309 | 0.0202 | 0.0174 | 0.0129 | 0.0198 | 0.0290 | 0.0241 | 0.0227 | 0.0151 | 0.0125 | 0.0086 | 0.0126 |
| GPT-GNN | 0.0528 | 0.0426 | 0.0319 | 0.0236 | 0.0194 | 0.0147 | 0.0342 | 0.0404 | 0.0302 | 0.0229 | 0.0178 | 0.0124 | 0.0109 | 0.0240 |
| HeCo | 0.0508 | 0.0403 | 0.0326 | 0.0240 | 0.0210 | 0.0160 | 0.0324 | 0.0401 | 0.0288 | 0.0219 | 0.0180 | 0.0117 | 0.0101 | 0.0245 |
| MPKG | 0.0601 | 0.0481 | 0.0452 | 0.0270 | 0.0227 | 0.0181 | 0.0358 | 0.0431 | 0.0348 | 0.0358 | 0.0213 | 0.0168 | 0.0129 | 0.0262 |
| Impro. | 13.83% | 12.91% | 41.69% | 12.5% | 17.01% | 23.13% | 4.68% | 6.68% | 15.23% | 56.33% | 18.33% | 35.48% | 18.35% | 6.94% |

FIG. 11

(a) Comparison on Recall@20

(b) Comparison on MRR (a) Comparison on Recall@20     (b) Comparison on MRR

SYSTEMS AND METHODS FOR UNIVERSAL ITEM LEARNING IN ITEM RECOMMENDATION

CROSS REFERENCE(S)

The instant application is related to co-pending and commonly-owned U.S. nonprovisional application Ser. No. 63/395,709, filed Aug. 5, 2022, and Ser. No. 63/481,372, filed Jan. 24, 2023, both of which are hereby expressly incorporated herein by reference in their entirety.

TECHNICAL FIELD

The embodiments relate generally to natural language processing and machine learning systems, and more specifically to systems and methods for universal item learning via pre-training and generation of heterogeneous product knowledge graph.

BACKGROUND

Machine learning has been widely used in recommendation systems that provide recommendations to users, e.g., shopping items, movies, and/or the like. The recommendations are often determined based on the past interactions between a user and an item (e.g., a product). However, when there is not sufficient interactions/interferences for the recommendation systems to learn from, the recommendations may be poorly determined, e.g., lacking relevance to the user's interests. This can lead to a cold-start problem, which refers to when items added to a catalogue have none or very little interactions. For example, when a new item is added to the catalogue, there is not sufficient interactions between the user and the item. There is thus not sufficient interactions amongst items which are often determined based user past interests in the items that have sufficient interactions.

Therefore, there is a need for an item-based recommendation system that is adaptable in zero-shot settings.

BRIEF DESCRIPTION OF THE DRAWINGS

FIG. 3 is a simplified block diagram illustrating aspects of a finetuning stage of the universal item learning framework on a recommendation task, according to embodiments described herein.

FIG. 4 is a simplified block diagram illustrating aspects of an inductive inference stage of the trained universal item learning framework to generate a universal item embedding for a zero-shot item, according to embodiments described herein.

FIG. 7 is an example logic flow diagram illustrating a method of pretraining a multi-task model to generate universal item embeddings based on the framework shown in FIGS. 1-6, according to some embodiments described herein.

FIGS. 8-13 represent exemplary test results using embodiments described herein.

Figure 1:
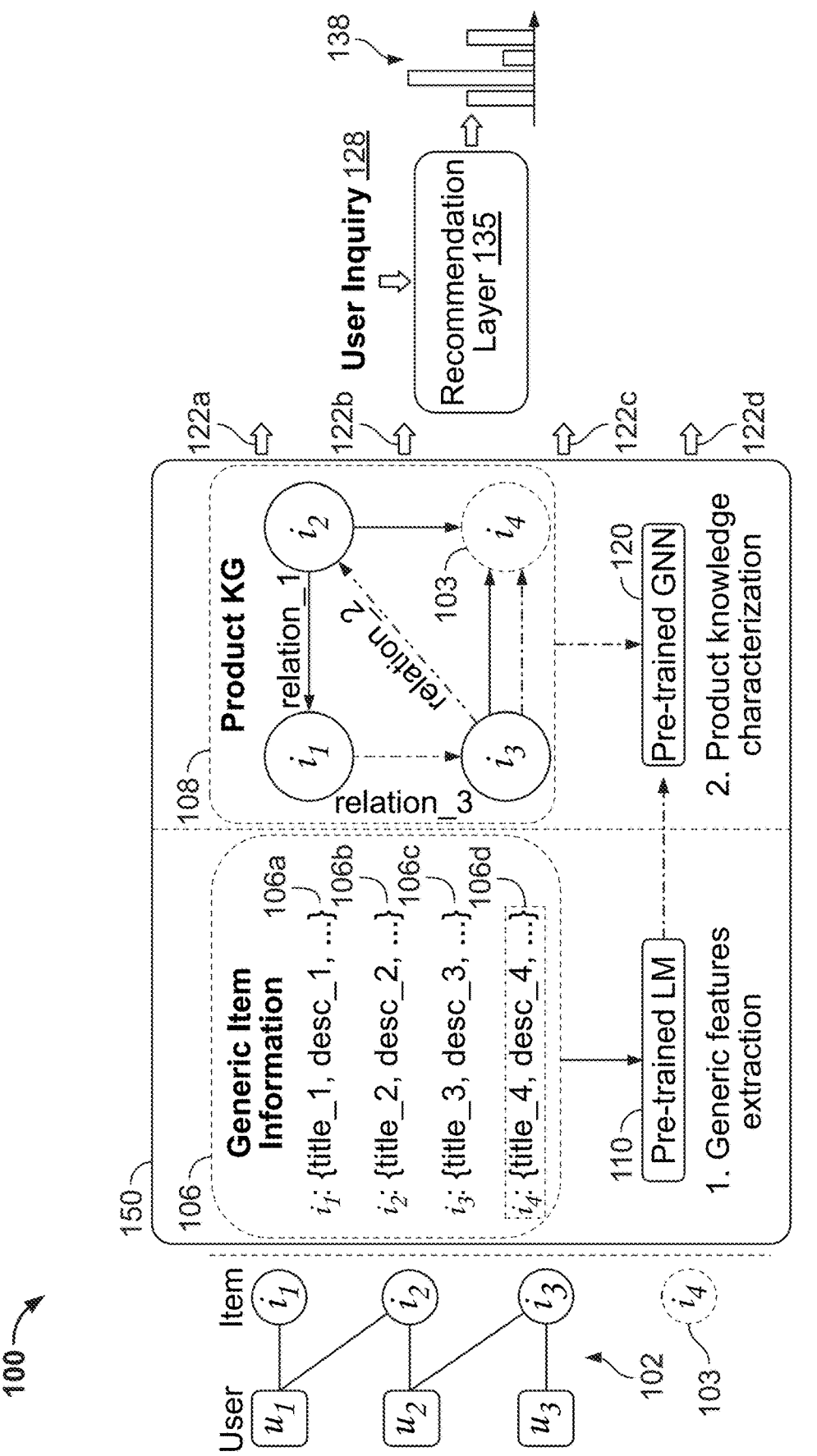
FIG. 1 is a simplified block diagram illustrating an overview of the universal item learning framework, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Recommender systems provide personalized information retrieval services to users, such as fashion items, movies, books, and/or the like. Most existing recommender systems rely on historical interactions of users and items. However, for items that have few to no historical interactions, these existing recommender systems may not provide accurate recommendations relating to such items (referred to as "cold-start items"). That is because without historical interactions, the representations of cold-start items are not optimized during traditional training.

In view of the need for an item-based recommendation system that is adaptable in zero-shot settings, embodiments described herein provide systems and methods for universal item learning framework that generates universal item embeddings for zero-shot items. Specifically, the universal item learning framework performs generic features extraction of items and product knowledge characterization based on a product knowledge graph (PKG) to generate embeddings of input items. A pretrained language model (PLM) may be adopted to extract features from generic item side information, such as titles, descriptions, etc., of an item. A PKG may be constructed to represent recommendation-oriented knowledge, which comprise a plurality of nodes representing items and a plurality of edges connecting nodes represent different relations between items. As those relations in PKG are usually retrieved from user-item interactions, the PKG adapts the universal representation for recommendation with knowledge of user-item interactions. A graph neural network (GNN) model may be adopted to refine the features extracted from PLM with knowledge from PKG such that the final universal item representations captures semantics relevant to recommendation tasks.

In one embodiment, the universal item embedding framework is pretrained according to a number of pretraining objectives, and the pretrained model is finetuned on recommendation task. Specifically, the universal item embedding framework comprises a multi-relation graph encoder with adaptation ability, which is adapted to different tasks via task-oriented adaptation layers. The task-oriented adaptation layers intake embeddings from the graph encoder, and output task-oriented embeddings. For example, the task-oriented adaptation layers may generate task-oriented embeddings according to four pretraining tasks to optimize the graph encoder and ToA layers, which are Knowledge Reconstruction (KR), High-order Neighbor Reconstruction (HNR), universal Feature Reconstruction (FR), and Meta Relation Adaptation (MRA) tasks. KR and HNR tasks function together to characterize the multi-type relations in PKG. HNR task aims at alleviating semantic divergence problem. And, MRA task targets at adapting the pre-trained models to zero-shot task during the fine-tuning stage. Each task is associated with one type of the task-oriented adaptation layer.

In this way, after pre-training and fine-tuning, the universal item embedding framework may tackle the zero-shot problems thereby generating a universal embedding for zero-shot items, which enhances the framework with inductive ability.

FIG. 1 is a simplified block diagram illustrating an overview of the universal item learning framework 100, according to embodiments described herein. As shown in FIG. 1, the universal item learning framework 100 may comprise a universal item encoder 150 and a recommendation decoder layer 135. The universal item encoder 150 may encode user-item interaction information and item information into universal embeddings 122a-d for each item $i_1$, $i_2$, $i_3$, and $i_4$.

In one implementation, the input items may comprise zero-shot items. For example, the input user-item interactions 102 may describe the interactions between users $u_1$, $u_2$ and $u_3$ and items $i_1$, $i_2$ and $i_3$. Compared with other items, item $i_4$ has no interactions with users, and hence $i_4$ is a zero-shot item.

In one embodiment, the universal item encoder 150 may comprise two components, e.g., a pre-trained language model (PLM) 110 for generic features extraction and a pretrained graph neural network (GNN) 120 for product knowledge characterization. The PLM 110 may extract features from generic item side information 106 (e.g., 106a-d corresponding to items $i_1$, $i_2$, $i_3$, and $i_4$ respectively), such as titles, descriptions, price, and/or the like of each item. However, direct inference of item representations from PLMs may not be sufficient for aligning the semantics of items for recommendation, thus impairing zero-shot performance. Therefore, the GNN 120 performs product knowledge characterization to enhance the universal representation of items for recommendation.

Specifically, the PKG 108 is constructed to represent recommendation-oriented knowledge. The PKG 108 may take a form of a graph, which comprise a plurality of nodes representing items and a plurality of edges connecting nodes represent different relations between items. For example, the relation between two nodes (items) may be complementary (e.g., item "liquid foundation" and item "loose powder foundation"), substitution (e.g., item "sheer finish powder" and item "matte finish powder"), and/or the like. The example of PKG 108 in FIG. 1 shows that items $i_1$, $i_2$, $i_3$, are interconnected under three relations. These relations are usually retrieved from user-item interactions 102, and thus the resulting PKG may adapt the universal representation of items for recommendation.

For example, the GNN 120 may be pretrained to refine the features extracted from PLM 110 such that the final universal item representations captures semantics relevant to recommendation tasks. The GNN 120 may encode the PKG 108 including the zero-shot item 103 based on the generic item features from the PLM 110 to generate universal item embeddings 122a-d for items $i_1$, $i_2$, $i_3$, and $i_4$.

In this way, the generated universal item embeddings 122a-d may be input to a recommendation decoder layer 135, which may in turn generate, in response to a user inquiry 128, a recommendation distribution 138 indicating likelihoods of recommending the items $i_1$, $i_2$, $i_3$, and $i_4$, to a specific user.

Figure 2:
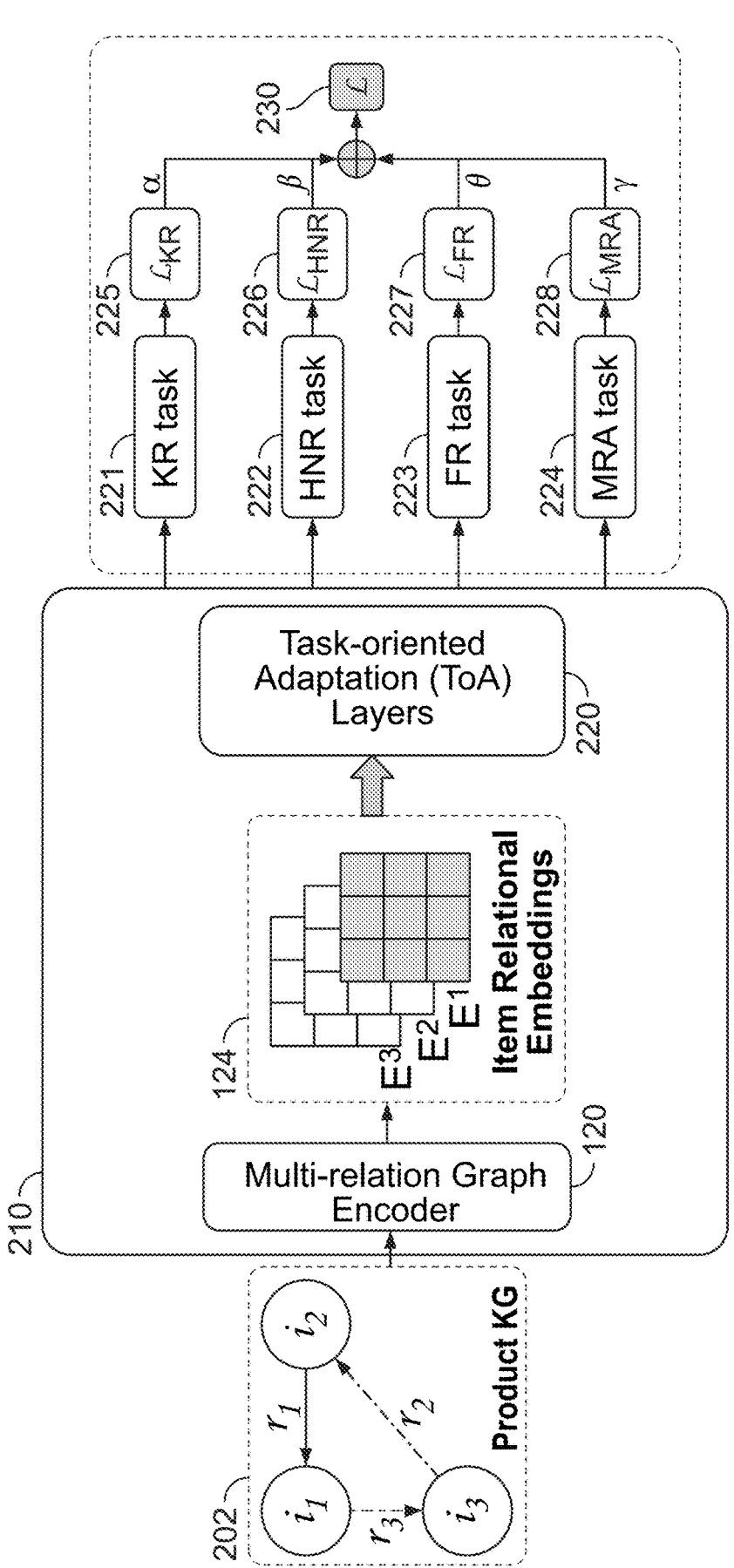
FIG. 2 is a simplified block diagram illustrating aspects of a pretraining stage of the universal item learning framework under a variety of product knowledge graph (PKG) pretraining tasks, according to a variety of pretraining tasks, according to embodiments described herein.

FIG. 2 is a simplified block diagram illustrating aspects of a pretraining stage of the universal item learning framework under a variety of PKG pretraining tasks, according to a variety of pretraining tasks, according to embodiments described herein. The GNN 120 as shown in FIG. 1, which may be a multi-relation graph encoder, may be pretrained together with a task-oriented adaptation layer 220 according to a variety of pretraining tasks. The GNN 120 and the task-oriented adaptation layer 220 may form a multi-relation item encoder 210 (similar to 150 in FIG. 1).

In one embodiment, user-item interaction data may be used to construct a PKG 202 as training data for the GNN 120. For example, a PKG 202 is denoted as $\mathcal{G} = \{I, \varepsilon, \mathcal{R}, X, \theta\}$, where I and $\varepsilon$ denote the sets of item nodes and edges, respectively. $\mathcal{R}$ is the relation type of edges, which is associated with E via a edge-type mapping function $\theta$: $\varepsilon \rightarrow \mathcal{R}$. $X \in \mathbb{R}^{|I| \times d}$ denotes the feature vector for nodes, which is extracted from item generic side information via PLMs. For each edge type $r \in \mathcal{R}$, its r-PKG is defined as $\mathcal{G}^r = \{I, \varepsilon^r, X\}$, where $\varepsilon^r$ only has edges in relation $r$.

Therefore, the PKG 202 is constructed to represent the universal features from item generic information and item-item connections derived from either meta-data or user-item interactions. Specifically, the universal item features are task-invariant item generic features. For example, items feature embeddings, X, may be extracted by a PLM (e.g., 110 in FIG. 1) such as the pre-trained BERT by using the concatenated description and title texts 106 of items as input. Item-item connections are derived from the collected feedback. The resulting PKG 202 consists of multiple item relationships, including complement, co-view, substitute, etc, which are extracted from user interaction data 102. As shown in FIG. 2, the example PKG 202 includes three nodes representing items $i_1$, $i_2$, $i_3$, and edges representing three relations $r_1$, $r_2$, $r_3$, (as illustrated by the different line patterns).

It is noted that PKG 202 only has one node type, i.e. items, but may have multiple edge types (relations) between items, e.g. co-purchasing, co-view, etc. To achieve knowledge-enhanced universal item representations, the GNN 120 that encodes nodes to embeddings in PKG 202 is pretrained to preserve heterogeneous semantics of items, including both the features of items and their associated relations.

Thus, given a PKG $\mathcal{G}$ 202, the PKG pre-training task is to learn an encoder $Enc(\mathcal{G}) \rightarrow E \in \mathbb{R}^{|I| \times d}$, where each node $i \in I$ is represented as an embedding $e_i \in \mathbb{R}^d$. Though the resulting encoder $Enc(\cdot)$ 210 is able to generate embeddings for all nodes in PKG $\mathcal{G}$, zero-shot items may not be present in the pre-training stage of the graph encoder, as illustrated that the PKG 202 at the pretraining stage is constructed with items that have an interaction history with at least one user (e.g., zero-shot item $i_4$ is not included).

At the PKG pretraining stage 200, the constructed PKG 202 is encoded by the GNN 120 to obtain item relational embeddings 124 over various relationships. The semantics of PKG 202 may contain multiple item-item relations. Therefore, during PKG pre-training stage 200 of the graph encoder 120, both relations and node features are ingested for encoding the graph 202. For example, node features may be obtained from the PLM 110 (now shown in FIG. 2) in FIG. 1. In this way, the graph encoder 120 will have the inductive inference ability such that zero-shot item embeddings can be inferred during the inference stage.

In one embodiment, the graph encoder 120 may encode the PKG 202 based on the message-passing framework for each edge type. Specifically, for each edge type $r \in \mathcal{R}$, the graph encoder 120 may extract the r-PKG as $\mathcal{G}^r = \{I, \varepsilon^r, X\}$. The item relational embeddings 124 with M layers of message aggregation are then obtained on as follows:

$$Enc(\mathcal{G}^r) \to E^r = \left( D^{-\frac{1}{2}} \tilde{A} D^{-\frac{1}{2}} \right)^M X W^r, \tag{1}$$

where $\varepsilon^r \in \mathbb{R}^{|I| \times d}$ is the embeddings of items with respect to relation ☒, D denotes the degree matrix of $\tilde{A}$, $\tilde{A}$ is the adjacency matrix with self-loop for ☒-PKG, and $W^r \in \mathbb{R}^{d \times d}$ is the weight matrix. The advantage of this simple form and the removal of activation in each aggregation layer allows the pre-computation of high-order neighborhood connectivity matrix, which significantly increases the efficiency. Also, since the multi-layer message aggregation process i.e., the term $$\left( D^{-\frac{1}{2}} \tilde{A} D^{-\frac{1}{2}} \right)^M$$

can be decoupled from the feature transformation step, i.e. the term $XW^r$, the PKG can then be updated with zero-shot items and conduct the message-passing directly on updated PKG, thus ensuring the inductive inference ability.

In one embodiment, the item relational embeddings 124, comprising $|\mathcal{R}|$ item embedding matrices given $|\mathcal{R}|$ relationships, may be passed to the task-oriented adaptation layers 220 to fuse all embeddings from all relations. Due to the domain discrepancy from our PKG pre-training tasks to the zero-shot task, the embeddings 124 are adapted to different pretraining tasks such that semantics from multiple relations can be properly fused. For example, let $\{E^r\}|_{r \in \mathcal{R}}$ denote the item relational embeddings 124 for $|\mathcal{R}|$ relations, the task-oriented adaptation layers 220 generate the fused embedding for a specific task ☒ as:

$$E_t = ToA_t(\{E^r\}|_{r \in \mathcal{R}}) \tag{2}$$

where ToA☒ can be arbitrary read-out functions, such as concat, mean-pooling, weighted-sum, etc.

In one embodiment, the task-oriented adaptation layers 220 may be defined for various pre-training tasks and fine-tuning on down-stream tasks. For example, the task-oriented adaptation layers 220 may be adapted to generate a knowledge reconstruction (KR) pretraining task output 221. Let (☒, ☒, ☒) denote a knowledge triplet, where items ☒ and ☒ are connected by relation ☒. To preserve the original semantics from each relation, the knowledge reconstruction task may be adopted with respect to each relation. To be concrete, a link prediction task for each relation is performed. In each link prediction task, the encoded item embeddings $E^\varepsilon$ must effectively reconstruct the item-item knowledge triplets under relation ☒. Therefore, in this knowledge reconstruction task for relation ☒, the task-oriented adaptation layers 220 use only the embedding $E^☒$ to calculate the knowledge reconstruction score $$s_{ij}^r$$

as the KR task output 221 as follows:

$$s_{ij}^r = \sigma(E_i^r \cdot E_j^r) \tag{3}$$

where ☒ (•) denotes the sigmoid activation function and $$E_i^r \text{ and } E_j^r$$

represent the embeddings under relation ☒ for item ☒ and ☒, respectively.

The item knowledge link reconstruction loss 235, $\mathcal{L}_{KR}$, may then be computed as the binary cross-entropy loss between positive triplet and negative triplet based on the computed KR scores and sum over all relations:

$$\mathcal{L}_{KR} = \sum_{r \in \mathcal{R}} -\frac{1}{|\varepsilon^r|} \sum_{(i,j) \in \varepsilon^r} \left( \log s_{ij}^r + \log \left( 1 - s_{ij\_}^r \right) \right), \tag{4}$$

where $E^☒$ denotes all links under relation ☒ and $(i, j\_) \notin \varepsilon^r$ is a negative sample to pair with the positive link.

For another example, the task-oriented adaptation layers 220 may be adapted to generate a High-order Neighbor Reconstruction (HNR) task output 222. While the knowledge reconstruction task encourages the graph encoder 120 to be relation-aware, due to sparsity of PKGs, it is insufficient to only consider direct neighbors. Thus, the higher-order neighbors in the PKG are leveraged to fully reconstruct the semantics. Specifically, the embeddings 124 may be enhanced by reconstructing the ☒-order neighbors, regardless of relationships, which is defined as the High-order Neighbor Reconstruction (HNR) task. This task simultaneously incorporates semantics from all relations. Hence, the task-oriented adaptation layers 220 may generate the concatenation for all embeddings, $$E_{HNR} = ToA_{HNR}(\{E^r\}|_{r \in \mathcal{R}}) = Concat(\{E^r\}|_{r \in \mathcal{R}}), \tag{5}$$

where $E_{HNR}$ and $ToA_{HNR}$ denotes the item embeddings and the task-oriented adaptation layer for this HNR task respectively. The ☒-order neighbors of each item may be first collected, denoted as $N_{☒}(☒)$. Then the task-oriented layers 220 may compute the HNR task output 222 as the neighbor reconstruction score $☒_{☒☒}$ between item ☒ and ☒, which is defined as the soft dot-product:

$$a_{ij} = \sigma(E_{HNR}(i) \cdot E_{HNR}(j)), \tag{6}$$

where $E_{HNR}(☒)$ and $E_{HNR}(☒)$ represent the HNR embedding for item ☒ and ☒, respectively. Next, a binary cross-entropy loss may be computed based on the reconstruction scores as follows:

$$\mathcal{L}_{HNR} = -\sum_{i\in I}\sum_{j\in N_K(i)} (\log a_{ij} + \log(1 - a_{ij\_})), \tag{7}$$

where ⍰ denote a K-hop neighbor of item ⍰ and ⍰_ denotes a negative sample to pair with ⍰ such that $j\_ \in I\backslash N_K(i)$.

For another example, the task-oriented adaptation layers 220 may be adapted to generate a feature reconstruction (FR) task output 223. The universal item features encode the basic item generic information and benefit the inductive inference for zero-shot items. However, since universal item features are extracted from PLMs 110, there is a large semantic divergence between the universal item features and output from multi-relation graph encoder. Therefore, the FR task is to optimize the graph encoder such that semantic divergence is mitigated. The task-oriented adaptation layers 220 may act as a decoder to reconstruct the universal item features from the item embeddings 124 from graph encoder 120. For this task, semantics from all relations are also harnessed. Hence, the task-oriented adaptation layers 220 may perform the concatenation, as follows:

$$E_{FR} = ToA_{FR}(\{E^r\}|_{r\in\mathcal{R}}) = Concat(\{E^r\}|_{r\in\mathcal{R}}), \tag{8}$$

where $E_{FR}$ denotes the item embeddings for this FR task. Then, the task-oriented adaptation layer 220 inputs this $E_{FR}$ to a decoder Dec(•) such that the universal feature (which can be seen as the FR task output 223) from PLMs can be reconstructed, formulated as follows:

$$\tilde{X} = Dec(E_{FR}), \tag{9}$$

where $\tilde{X}$ is the feature decoded from the concatenated relational embeddings. Though a wide range of decoders can tackle this FR task, one fully-connected layer may be used as the decoder here because a light-weight decoder is less complex to optimize and the output embeddings from the graph encoder 120 can be linearly aligned with universal features. Then, a measurement of $⍰_2$ loss 227 may be computed between original features and reconstructed features as follows:

$$\mathcal{L}_{FR} = \sum_{i\in I} \left\| X_i - \tilde{X}_i \right\|_2^2, \tag{10}$$

where $X_i$ and $\tilde{X}_i$ are the universal and reconstructed features for item ⍰, respectively.

For another example, the task-oriented adaptation layers 220 may be adapted to generate a Meta Relation Adaptation (MRA) task output 224. The objective of pre-training the graph encoder 120 is to yield embeddings for the items in the downstream zero-shot task. Nevertheless, due to the domain discrepancy between PKG semantics and the zero-shot task, different item-item relations have unequal contributions. Therefore, the relational embeddings 124 should be adapted to various tasks. Each relation ⍰ is thus treated as the target relation, and embeddings from other relations are used to reconstruct the edges in r-PKG $\mathcal{G}^r$, known as the ⍰-MRA task. Firstly, the task-oriented adaptation layers 220 may, for ⍰-MRA task, compute a weighted sum of all relational embeddings except the relation ⍰ embeddings, which is formulated as:

$$E_{r-MRA} = ToA_{r-MRA}(\{E^r\}|_{r\in\mathcal{R}}) = \sum_{r\in\mathcal{R}_{-r}} w_r E_r, \tag{11}$$

where $\mathcal{R}_{-r}$ denotes all relations but relation ⍰, and $w_r \in \mathbb{R}$ is a scalar weights, denoting the contrition of each relation embeddings in $\mathcal{R}_{-r}$. For example, a self-excitation layer may be used to compute the weight $⍰_{[i]}$, which ingests the associated relation embeddings into two multilayer perceptron (MLP) layers and normalizes those weights with respect to each relation with the softmax. The reason is self-excitation layer is easy to implement and fine-tune for new downstream tasks. Next, edges in ⍰-PKG may be predicted by a soft dot-product upon the ⍰-MRA embedding. The task-oriented adaptation layers 220 may compute the prediction score $⍰_{[i][i]}$ between item ⍰ and ⍰ as the MRA task output 224 formulated as follows:

$$b_{ij} = \sigma(E_{r-MRA}(i) \cdot E_{r-MRA}(j)), \tag{12}$$

where $E⍰_{-MRA}(⍰)$ and $E⍰_{-MRA}(⍰)$ represent the ⍰-MRA embeddings for items ⍰ and ⍰, respectively. The intuitive for this meta relation adaption task is to simulate the process of adapting relation embeddings to new tasks. The ⍰-MRA task views the edge prediction task on ⍰ relation as a new task and train the encoder to adapt the embeddings from other relation semantics to relation ⍰. In this way, the encoder 120 would have more generalization ability and endows the $ToA⍰_{-MRA}(•)$ layer more flexibility for downstream task adaptation, thus resolving the domain discrepancy problem between PKG semantics and the zero-shot task.

Next, a mean-square error loss 228 is computed for the MRA tasks for all relations:

$$\mathcal{L}_{MRA} = \sum_{r\in\mathcal{R}} -\frac{1}{|\mathcal{E}^r|} \sum_{(i,j)\in\mathcal{E}^r} (\log b_{ij} + \log(1 - b_{ij\_})), \tag{13}$$

where $\mathcal{E}^r$ denotes all edges under relation ⍰ and $(i,j\_)\notin\mathcal{E}^r$ is a negative sample to pair with the positive edge.

In one embodiment, the task-oriented adaptation layers 220 and the graph encoder 120 may be updated based on any of the losses 225, 226, 227 and 228. In another embodiment, the entire training framework may be jointly updated as a multi-task training framework. The final loss 230 is calculated as the weighted sum of four proposed losses:

$$\mathcal{L} = \alpha\mathcal{L}_{KR} + \beta\mathcal{L}_{FR} + \theta\mathcal{L}_{HNR} + \gamma\mathcal{L}_{MRA}, \tag{14}$$

where ⍰, ⍰, ⍰, and ⍰ are hyper-parameters, and chosen based on the best performance on the validation set.

Figures 3, 4:
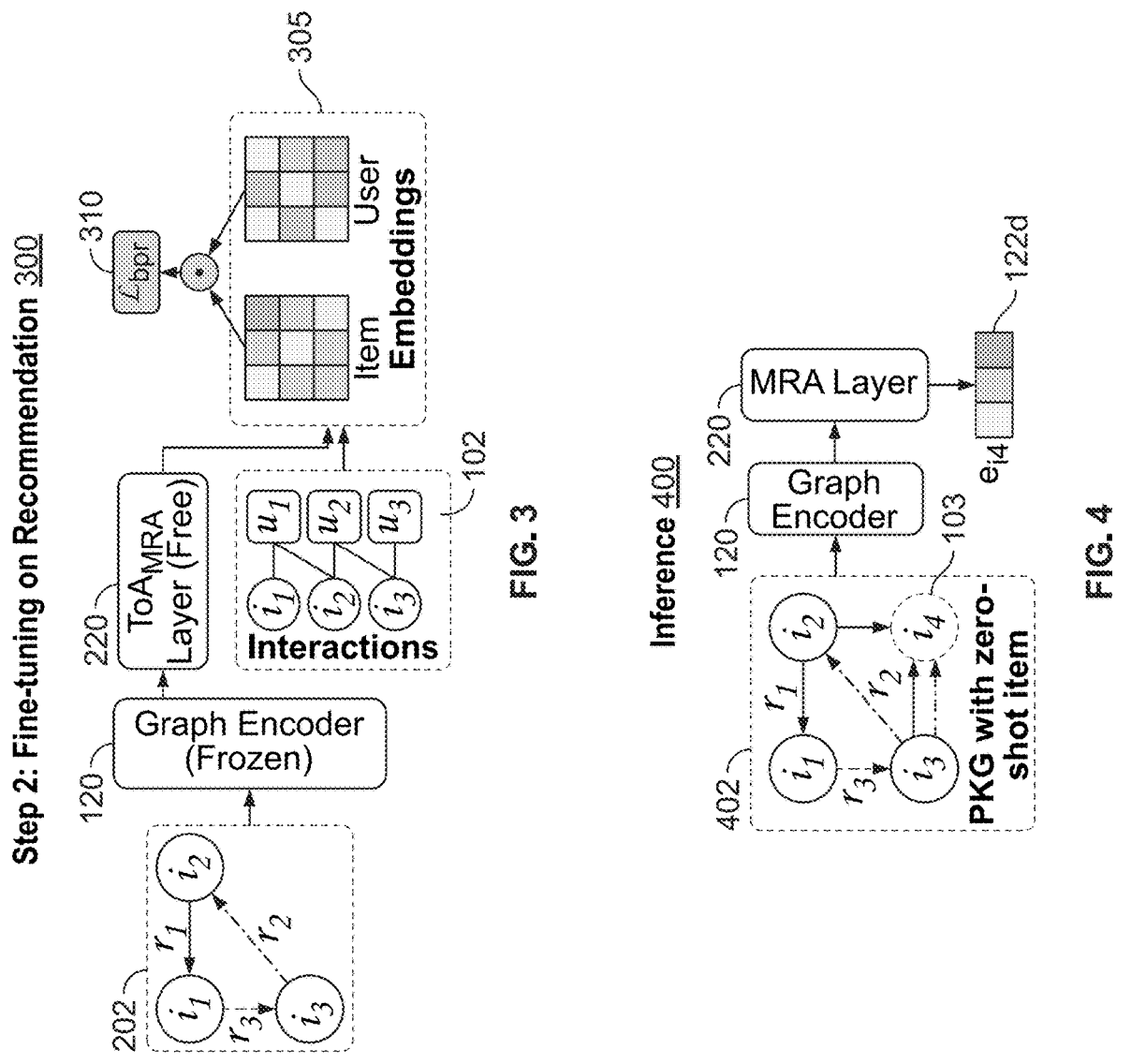

FIG. 3 is a simplified block diagram illustrating aspects of a finetuning stage 300 of the universal item learning framework on a recommendation task, according to embodiments described herein. After pretraining the graph encoder 120 and the task-oriented adaptation layer 220 in the pretraining stage 200 shown in FIG. 2, the universal item embedding framework may be finetuned on any new tasks.

For example, in one implementation, parameters in the graph encoder Enc(•) 120 and the task-oriented adaptation layers 220 may be updated by defining new objective functions for new tasks. The finetuning may affect the ToA$_{MRA}$ layers for all relations as it is most relevant to the zero-shot task and more efficient to adapt without loading the entire PKG again in the zero-shot settings. Therefore, FIG. 3 shows the finetuning of ToA$_{MRA}$ layers on zero-shot recommendation task for illustrative purpose only, and any other tasks to finetune other task-oriented adaptation layers can be achieved similarly.

In one embodiment, the ToA$_{MRA}$ layers 220 may be finetuned with a recommendation objective. Given the user-item interaction data 102, denoted as $\mathcal{D}=\{(u, i)u\in \mathcal{U}, i\in I\}$ where $\mathcal{U}$ is the user set, the pre-trained multi-relation item encoder 210 may be finetuned by only updating the ToA$_{MRA}$ layers 220 as free parameters and all other parameters (e.g., the graph encoder 120) are fixed. During the fine-tuning stage 300, the item embeddings are produced similar to Eq. (11), but involving all relations in PKG 202, denoted as $E_{MRA}=\sum r\in\mathcal{R}_r\ w_r E_r$. Recall that $w_r$ represents the contribution of each relation r and computed via self-excitation over the relational embedding $E_r$. Hence, the self-excitation layers are updated such that the contribution of each relation towards recommendation task can be characterized.

The recommendation task is to predict ranking scores between items and users. For each pair (▢, ▢), the user representation $e_▢$ 305 is computed as the mean aggregation for all interacted items, formulated as $$e_u = \frac{1}{|\mathcal{D}_u|}\sum_{i\in\mathcal{D}_u}E_{MRA}(i)$$

where $\mathcal{D}_u$ is the interacted items for user u and $E_{MRA}(i)$ denotes the output embedding for item i. Then, the ranking score $\rho_{ui}$ is computed between user u and item i via the dot-product similarity as follows:

$$\rho_{ui} = e_u \cdot E_{MRA}(i), \tag{15}$$

The Bayesian personalized ranking loss 310 is then computed as follows:

$$\mathcal{L}_{bpr} = \sum_{(u,i)\in\mathcal{D}} -\log \sigma(\rho_{ui} - \rho_{ui\_}), \tag{16}$$

where ▢_ is a negative item such that (u, i_)∉$\mathcal{D}$ for user ▢. After optimization, ToA$_{MRA}$ layers 220 are adapted to the recommendation task. In other words, ToA$_{MRA}$ layers 220 is updated based on the Bayesian personalized ranking loss 310 via backpropagation while the graph encoder 120 is kept frozen. It is noted that any other functions may be used to produce the final representation 305 of users and items for a recommendation task.

FIG. 4 is a simplified block diagram illustrating aspects of an inductive inference stage of the trained universal item learning framework to generate a universal item embedding for a zero-shot item, according to embodiments described herein. The finetuned model (comprising the graph encoder 120 and ToA$_{MRA}$ layers 220 after the two stages 200 and 300 shown in FIGS. 2-3, respectively) may be used to conduct inductive inference for the zero-shot item 103. For example, an updated PKG 402 with an added zero-shot item 103 may be input to the trained graph encoder 120. The generated item relational embedding from the graph encoder 120 may be passed to the ToA$_{MRA}$ layers 220, which may in turn generate prediction scores between users and all items according to Eq. (15.). Thus, ranking scores 422 for zero-shot item 14 corresponding to users $u_1$, $u_2$, and $u_3$ may be output from the ToA$_{MRA}$ layers 220, indicating likelihoods that the zero-shot item 14 may be recommended to users $u_1$, $u_2$, and $u_3$, respectively.

Computer and Network Environment

Figure 5:
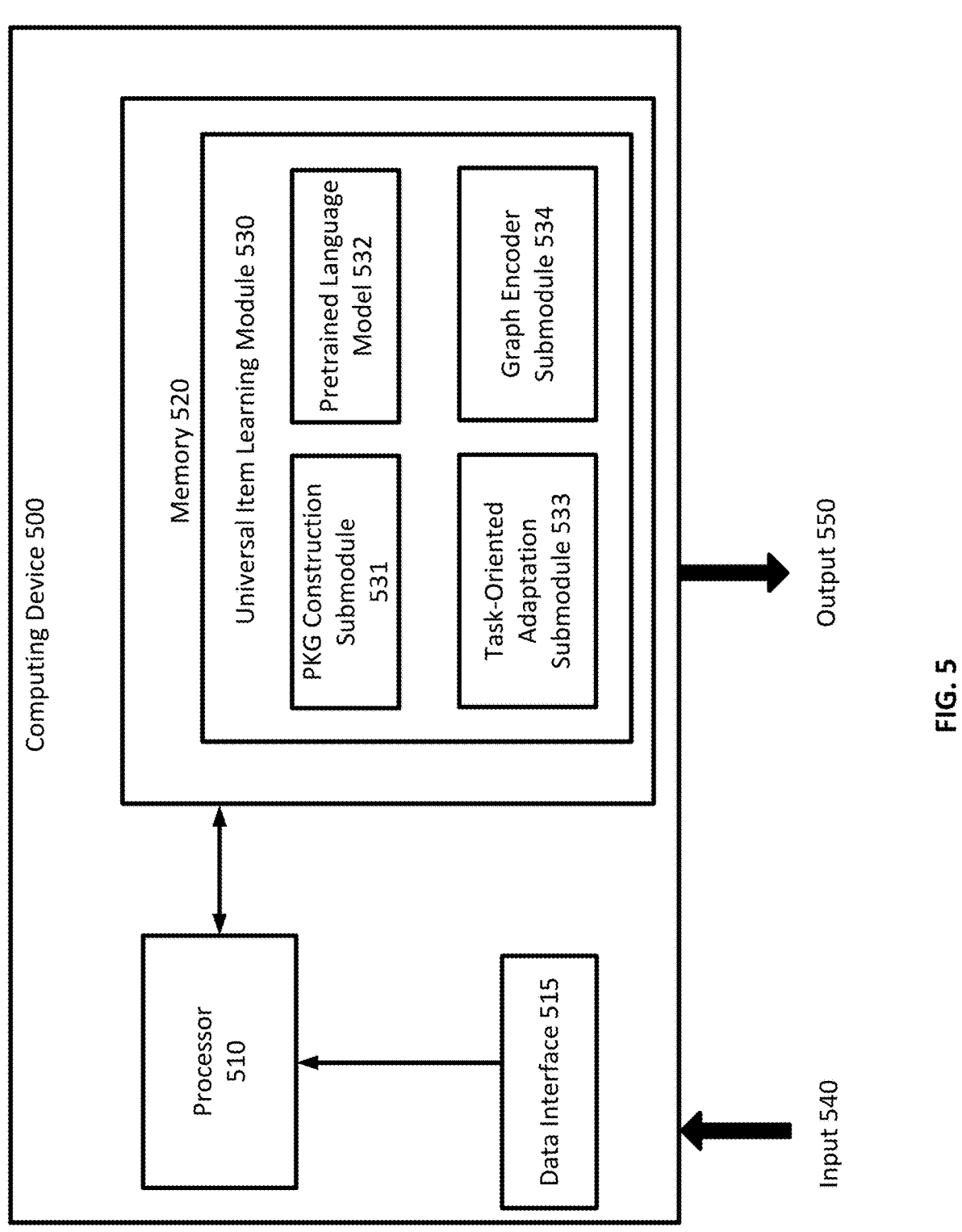
FIG. 5 is a simplified diagram illustrating a computing device implementing the universal learning framework described in FIGS. 1-4, according to one embodiment described herein.

FIG. 5 is a simplified diagram illustrating a computing device implementing the universal learning framework described in FIGS. 1-4, according to one embodiment described herein. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for universal item learning module 530 that may be used to implement and/or emulate the systems and models, and/or to implement any of the methods described further herein. universal item learning module 530 may receive input 540 such as an input training data (e.g., user-item interaction 102) via the data interface 515 and generate an output 550 which may be a recommendation score of an item for a user. Examples of the input data may include user-item interaction data (e.g., 102 in FIG. 1), item characteristics (e.g., 106 in FIG. 1), and/or the like. Examples of the output data may include prediction scores of a zero-shot item corresponding to different users (e.g., 422 in FIG. 4).

The data interface 515 may comprise a communication interface, a user interface (such as a voice input interface, a graphical user interface, and/or the like). For example, the computing device 500 may receive the input 540 (such as a training dataset) from a networked database via a communication interface. Or the computing device 500 may receive the input 540, such as a PKG (e.g., 202 in FIG. 2) based on user-item interaction, from a user via the user interface.

In some embodiments, the universal item learning module 530 is configured to generate a universal embedding for items in zero-shot settings. The universal item learning module 530 may further include PKG construction submodule 531, a pretrained language model submodule 532 (e.g., similar to 110 in FIG. 1), a task-oriented adaptation submodule 533 (e.g., similar to 220 in FIG. 2), and a graph encoder submodule (e.g., 110 in FIGS. 1-2). In one embodiment, the universal item learning module 530 and its submodules 531 may be implemented by hardware, software and/or a combination thereof.

In one embodiment, the universal item learning module 530 and one or more of its submodules 531 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 520 as a structure of layers of neurons, and parameters describing the non-linear transformation at each neuron and the weights associated with edges connecting the neurons. An example neural network may be a language model BERT, a graph neural network, and/or the like.

In one embodiment, the neural network based universal item learning module 530 and one or more of its submodules 531 may be trained by updating the underlying parameters of the neural network based on the loss described in relation to FIGS. 2-3. For example, the loss described in Eq. (14) or (16) is a metric that evaluates how far away a neural network model generates a predicted output value from its target output value (also referred to as the "ground-truth" value). Given the loss computed according to Eq. (14) or (16), the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6:
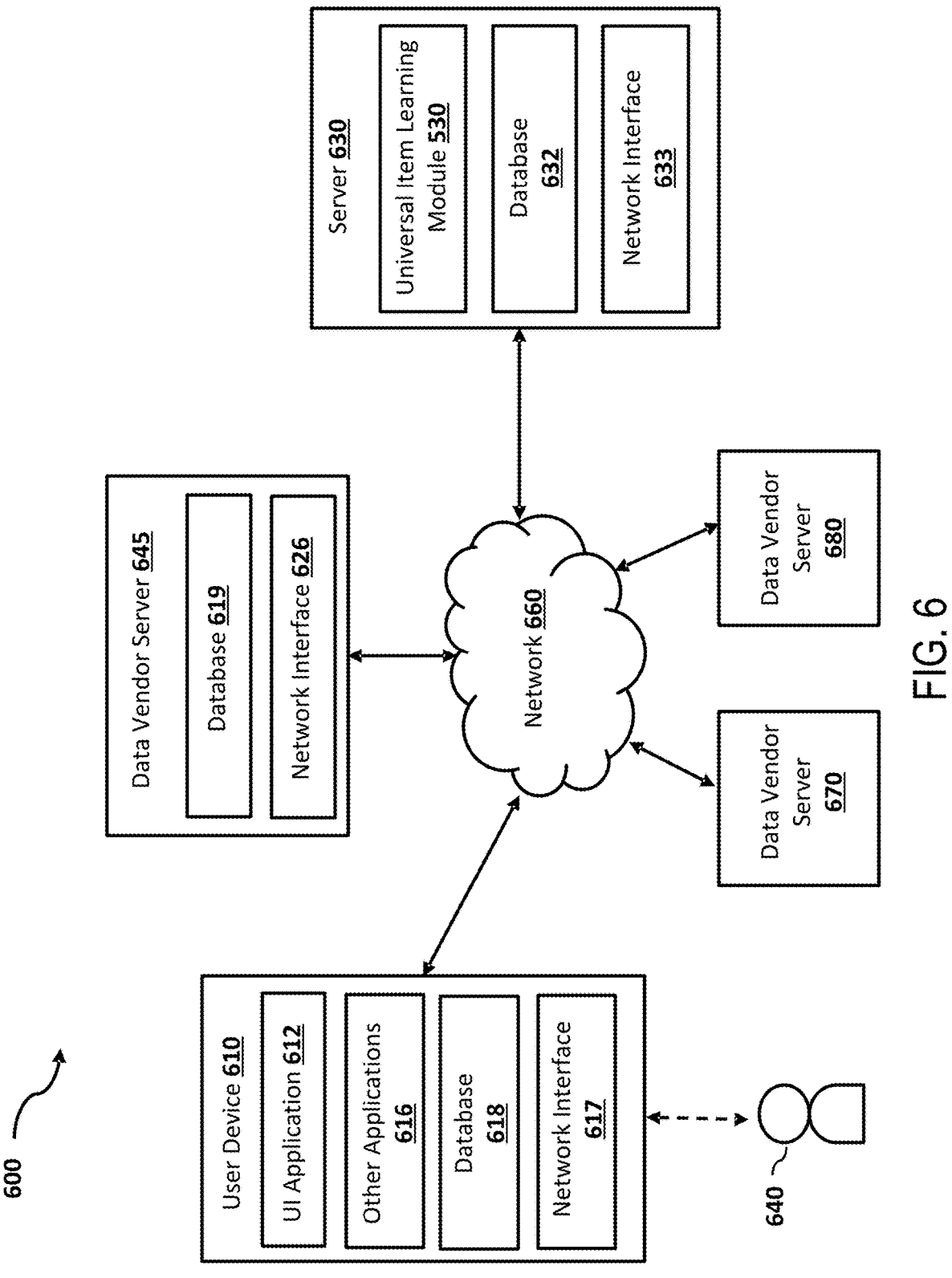
FIG. 6 is a simplified block diagram of a networked system suitable for implementing the universal item embedding learning framework described in FIGS. 1-4 and other embodiments described herein.
Figure 12:
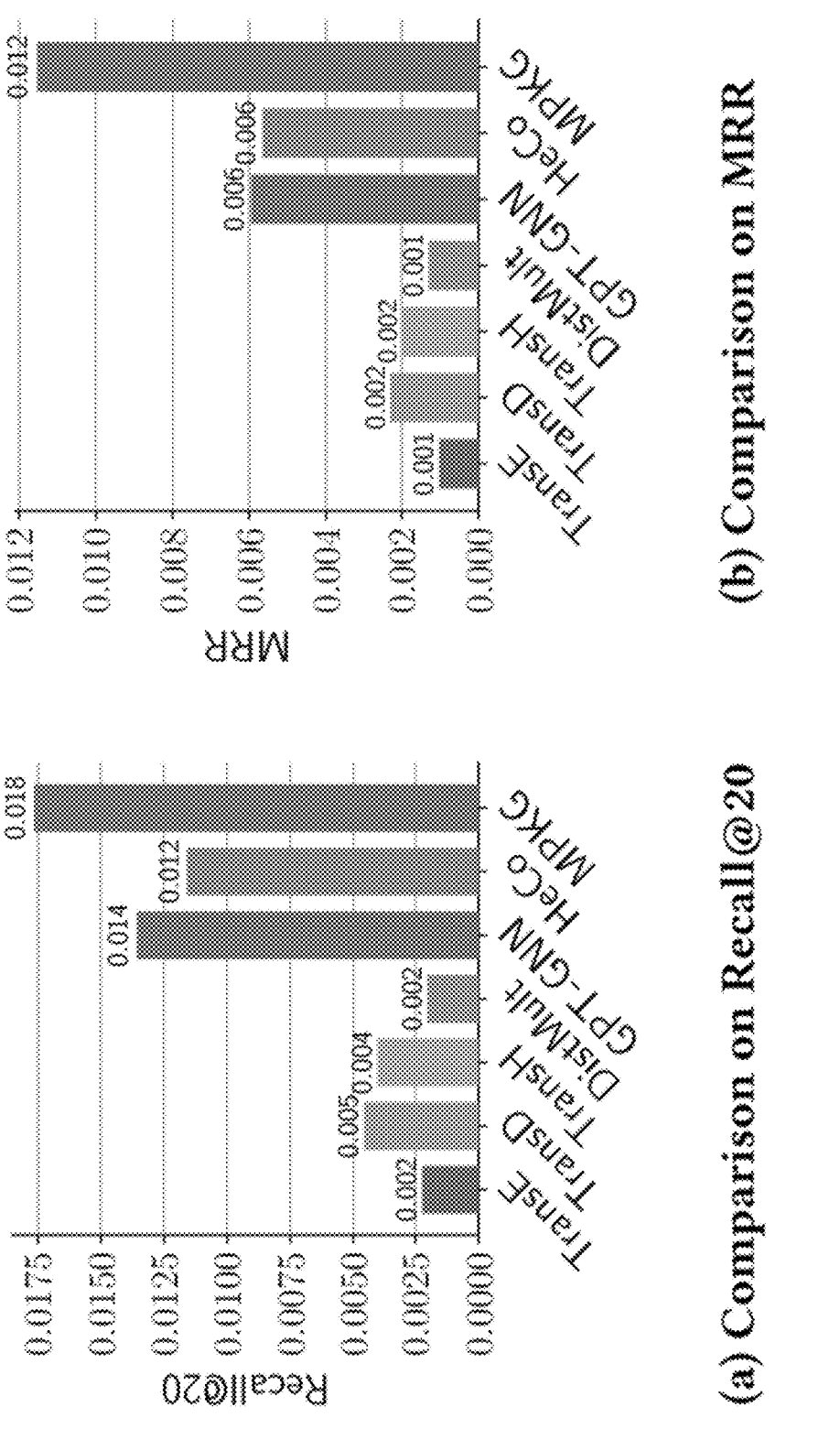

FIG. 6 is a simplified block diagram of a networked system 600 suitable for implementing the universal item embedding learning framework described in FIGS. 1-4 and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 500 described in FIG. 5, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating an item recommendation (for a user) from the server 630 and display the message via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view item recommendations.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including item-user interaction data (e.g., 102 in FIG. 1) to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the universal item learning module 530 and its submodules described in FIG.

5. In some implementations, universal item learning module 530 may receive data from database 619 at the data vendor server 645 via the network 660 to generate item prediction scores. The generated item recommendations may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the universal item learning module 530. In one implementation, the database 632 may store previously generated recommendations, PKG and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Work Flows

FIG. 7 is an example logic flow diagram illustrating a method of pretraining a multi-task model to generate universal item embeddings based on the framework shown in FIGS. 1-6, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the universal item learning module 530 (e.g., FIGS. 5-6) that performs universal item embedding learning.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, information relating to a plurality of items (e.g., 106 in FIG. 1) and user-item interactions (e.g., 102 in FIG. 1) may be received, e.g., via a communication interface (e.g., 515 in FIG. 5, 633 in FIG. 6).

At step 703, a product knowledge graph (PKG) (e.g., 202 in FIG. 2) representing item-item relations derived from the user-item interactions may be obtained. For example, the PKG may be constructed (e.g., by submodule 531 in FIG. 5) based on user-items information and item information. For another example, the PKG may be received via a communication interface. In one implementation, the product knowledge graph is constructed based on the information relating to the plurality of items and user-item interactions. A pretrained language model may extract item feature embeddings from the information relating to the plurality of items. The pretrained language model may further derive the item-item connections from collected feedback from the user-item interactions relating to the plurality of items.

At step 705, a graph encoder (e.g., 110 in FIG. 1) may encode at least a portion of the product knowledge graph corresponding to the plurality of items into a plurality of item relational embeddings (e.g., 124 in FIG. 2).

At step 707, a respective task-oriented adaptation layer (e.g., 220 in FIG. 2) may generate a respective pretraining output (e.g., 221, 222, 223 or 224 in FIG. 2) based on the plurality of item relational embeddings (e.g., 124 in FIG. 2). For example, the task-oriented adaptation layer adapts the plurality of item relational embeddings to a respective task and fuses the adapted plurality of item relational embeddings.

In one implementation, the respective pretraining objective may be the knowledge construction loss (e.g., 225 in FIG. 2). A knowledge reconstruction score is computed based on item-relational embeddings corresponding to a triplet of a first item, a second item and a specific relation between the first item and the second item, e.g., Eq. (3). A cross-entropy loss may be computed based on knowledge reconstruction scores computed from positive triplets and negative triplets, e.g., Eq. (4).

In one implementation, the respective pretraining objective is the high-order neighbor reconstruction loss (e.g., 226 in FIG. 2). For each item, item-relational embeddings corresponding to the respective item are concatenated into a respective item embedding, e.g., Eq. (5). A neighbor reconstruction score is computed between a first item and a second item based on a first item embedding and a second item embedding, e.g., Eq. (6). A cross-entropy loss is then computed based on neighbor reconstruction scores between pairs of items that are within a pre-defined number hops from each other, e.g., Eq. (7).

In one implementation, the respective pretraining objective is the feature reconstruction loss (e.g., 227 in FIG. 2). The plurality of item-relational embeddings may be concatenated into a concatenated relational embedding, e.g., Eq. (8). A decoder may generate a decoded feature from the concatenated relational embedding, e.g., Eq. (9). A feature reconstruction loss may be computed based on a distance between the decoded feature and original encoded item features, e.g., Eq. (10).

In one implementation, the respective pretraining objective is the meta relation adaptation loss (e.g., 228 in FIG. 2). For each respective item, a weighted sum of the plurality of item-relational embeddings corresponding to the respective item may be computed into a respective item embedding, e.g., Eq. (11). A prediction score may be computed between a first item embedding corresponding to a first item and a second item embedding corresponding to a second item, e.g., Eq. (12). A cross-entropy loss may be computed based on first prediction scores between pairs of items that are connected according to a specific relation and second prediction scores between pairs of items that are not connected according to the specific relation, e.g., Eq. (13).

At step 709, a respective pretraining objective (e.g., based 225, 226, 227 and/or 228 in FIG. 2) may be computed on the respective pretraining output and the at least portion of the product knowledge graph. For example, the pretraining objective may be a weighted sum of the multiple pretraining objectives.

At step 711, at least the graph encoder (e.g., 120 in FIG. 2) and the task-oriented adaptation layers (e.g., 220 in FIG. 2) may be updated based on multiple pretraining objectives via backpropagation.

At step 713, the updated graph encoder (e.g., 120 in FIG. 3) and at least one task-oriented adaptation layer (e.g., 220 in FIG. 3) may generate predicted ranking scores between the plurality of items and a set of users based on the product knowledge graph (e.g., 202 in FIG. 3). For example, for a first item, a weighted sum of the plurality of item-relational embeddings corresponding to the first item may be computed into a first item embedding. For a first user, a mean aggregation of all iterated items may be computed by averaging item embeddings corresponding to items that the first user has interacted with. The predicted ranking score may then be computed between the first user and the first item based on a similarity between the mean aggregation and the first item embedding, e.g., Eq. (15).

At step 715, a Bayesian ranking loss (e.g., 310 in FIG. 3) may be computed based on the ranking scores, e.g., Eq. (16).

At step 717, the at least one task-oriented adaptation layer (e.g., 220 in FIG. 3) may be finetuned based on the Bayesian ranking loss while keeping the updated graph encoder (e.g., 120 in FIG. 3) frozen. After the pretraining and finetuning in steps 701-717, for any new zero-shot items, the product knowledge graph may be updated with a new item (e.g., 103 in FIG. 4) and a set of relations between the new item and the plurality of items. The updated graph encoder (e.g., 120 in FIG. 4) and the finetuned at least one task-oriented adaptation layer (e.g., 220 in FIG. 4) may generate an item embedding for the new item. The item embedding comprises knowledge for a recommendation task deciding whether to recommend the new item for a specific user, e.g., prediction scores between the specific user and the new item.

Example Results

FIGS. 8-13 represent exemplary test results using embodiments described herein.

Data experiments are conducted on the largest category Home and Kitchen category in Xmarket dataset. The dataset consists of 18 markets, of which each has user-item reviews and item-item relationships as meta-data. The item-item relationships in meta-data as the PKG pre-training item relationships are considered, including alsoViewed, alsoBought, boughtTogether as these are widely used item relationships for recommendation. Item-item relationships pairs are aggregated from all markets and construct the PKG. Statistics of user-item interaction data of all markets is shown in Table 1 of FIG. 8. The data statistics of the product knowledge graph are in Table 2 of FIG. 9. The description and title texts as the universal textual information, and the item universal features X are extracted using a pre-trained language model.

The user-item interactions are ranked in chronological order. For example, data in the earliest 80% time for training, the following 10% time for validation, and the last 10% period for testing. The items appearing in the training data are the train item set. For validation and testing items appearing in the train item set, we denote them as warm items, otherwise, we denote them as zero-shot (zs) items. To avoid the data leakage problem all the cold items are deleted from PKG during training.

The effectiveness of proposed pre-training PKG framework via two evaluation tasks, i.e. the knowledge prediction task and zero-shot item-based recommendation (ZSIR) task.

The knowledge prediction task assesses the ability of pre-trained GNN 120 in recovering the semantics between items in the PKG. Specifically, the knowledge prediction task predicts the knowledge triplet links associated with items as head entities. The ZSIR task assesses the inference ability of MPKG on a downstream task.

The performance of both tasks is evaluated on all items and zero-shot items settings. For all downstream tasks, we generate the top-N ranking list from either the all item candidates, or only the test zero-shot items. Overall performance is illustrated on both settings to demonstrate the ability of our model in pre-training universal item embeddings. The inductive inference introduced shown in FIG. 4 infers the embeddings of zero-shot items with the complete PKG in test time. The standard ranking performance metrics Recall@N and Mean Reciprocal Rank (MRR) as evaluation metrics. The testing performance based on the grid-searched best validation performance is also shown.

To validate the effectiveness of the proposed framework, the model is compared with the following two groups of related base-lines: (1) Triplet-based heterogeneous graph methods, including TransE (Bordes et al., Translating embeddings for modeling multi-relational data, Advances in neural information processing systems 26 (2013)), TransD (Ji et al., Knowledge graph embedding via dynamic mapping matrix, in Proceedings of the 53rd annual meeting of the association for computational linguistics and the 7th international joint conference on natural language processing (volume 1: Long papers). 687-696), DistMult (Zhang et al., Knowledge graph embedding with hierarchical relation structure, in Proceedings of the 2018, Conference on Empirical Methods in Natural Language Processing. 3198-3207), and TransH (Wang et al., Knowledge graph embedding by translating on hyperplanes, in Proceedings of the AAAI conference on artificial intelligence, vol. 28); (2) Heterogeneous graph models, including GPT-GNN (Hu et aL, GPT-GNN: Generative pre-training of graph neural networks, in Proceedings of the 26th ACM SIGKDD International Conference on Knowledge Discovery & Data Mining. 1857-1867, 2020) with a generative graph model framework and HeCo (Wang et al., Self-supervised heterogeneous graph neural network with co-contrastive learning, in Proceedings of the 27th ACM SIGKDD Conference on Knowledge Discovery & Data Mining, 1726-1736, 2021) with the self-supervised graph learning architecture.

The multi-task pretraining graph encoder is implemented in PyTorch and conduct the experiments with 4 V100 GPUs. During the pre-training stage, only the knowledge triplets are accessed and the best pre-training framework based on the validation performance on validation set of knowledge triplets predictions. For all methods, the hidden dimension from $\{64, 128\}$ is searched, the L2 regularization weight from $\{1 \boxtimes^{-3}, 1 \boxtimes^{-2}, 1 \boxtimes^{-1}, 5 \boxtimes^{-1}\}$, the learning rate from $\{1 \boxtimes^{-3}, 1 \boxtimes^{-4}, 5 \boxtimes^{-3}\}$, the batch size is set to be 256, the base GNN is SGC (Wu et al., 2019), and the number of GNN layers is default at 3. For all triplet-based heterogeneous graph baselines, we search the hidden dimension and L2 regularization weight. For heterogeneous graph model GPT-GNN (Hu et al, 2020), additionally the attribute generation loss ratio is searched from $\{0.1, 0.3, 0.5, 0.7, 0.9\}$ and the queue size from $\{128, 256, 512\}$. For HeCo (Wang et al., 2021), its dropout rate for features and attentions are searched from $\{0.1, 0.3, 0.5, 0.7, 0.9\}$.

Zero-shot evaluation in multiple markets. Performance is reported on all items recommendation in Table 3 of FIG. 10 and the performance on only zero-shot items recommendation in Table 4 of FIG. 11. 7 markets due to the space limitation are listed. The first three from the left are the smallest 3 markets while the remaining 4 markets are the largest 4 markets.

In both all items and zero-shot items recommendations, the proposed model consistently achieves the best performance in all markets and all metrics. The relative improvements range from 23.08% to 83.33% in all items recommendation. For zero-shot items recommendation, the improvements are from 4.68% to 56.33%. These improvements demonstrate that the proposed framework successfully addresses the domain discrepancy between the PKG and the downstream zero-shot task in the zero-shot setting, which assumes no data is seen in the pre-training stage. The improvements come from the superior pre-training capability on handling multi-type item relationships and the adaptation layer to improve the generalization capability.

The pre-training heterogeneous GNN baselines outperform the triplet-based methods. However, there is not a consistent winner among heterogeneous GNN baselines. This again demonstrates the importance of multi-type relations modeling in GNN.

The improvements on low-resource markets are larger than the rich markets. For example, in all items recommendation, the low-resource markets have at least 36.53% relative improvements in NDCG@20 while the larger markets have at most 33.52%. This demonstrates that proposed model can benefit low-resource markets more than rich markets, indicating better generalization capability.

FIGS. 12A and 12B shows the pre-training effectiveness of the proposed model in learning item-item relationships predictions, in both warm items (seen items in training portion) and zero-shot items (unseen items). The knowledge prediction task validates the capability of pre-training with product knowledge graph information over existing methods. The knowledge prediction performance of product knowledge graph triplets on warm items are shown in FIG. 3. Recall@20 and MRR are shown in FIG. 12a and FIG. 12b, respectively.

The proposed model achieves the best warm item knowledge prediction performance in both metrics, with relative improvements from 28% to 100% in all metrics. This superior capability may be attributed to the design of several proposed pre-training tasks as it mitigates the semantic divergence between generic information and item multi-relations.

Among compared baselines, it is observed that pre-training methods based on heterogeneous GNN (GPT-GNN, HeCo, and our MPKG) achieve better performances than triple-based methods. The heterogeneous GNN methods outperform triplet-based methods due to the stronger modeling capability of multi-relations in PKG while triplet-based methods only model direct connections and item features.

Figure 13:
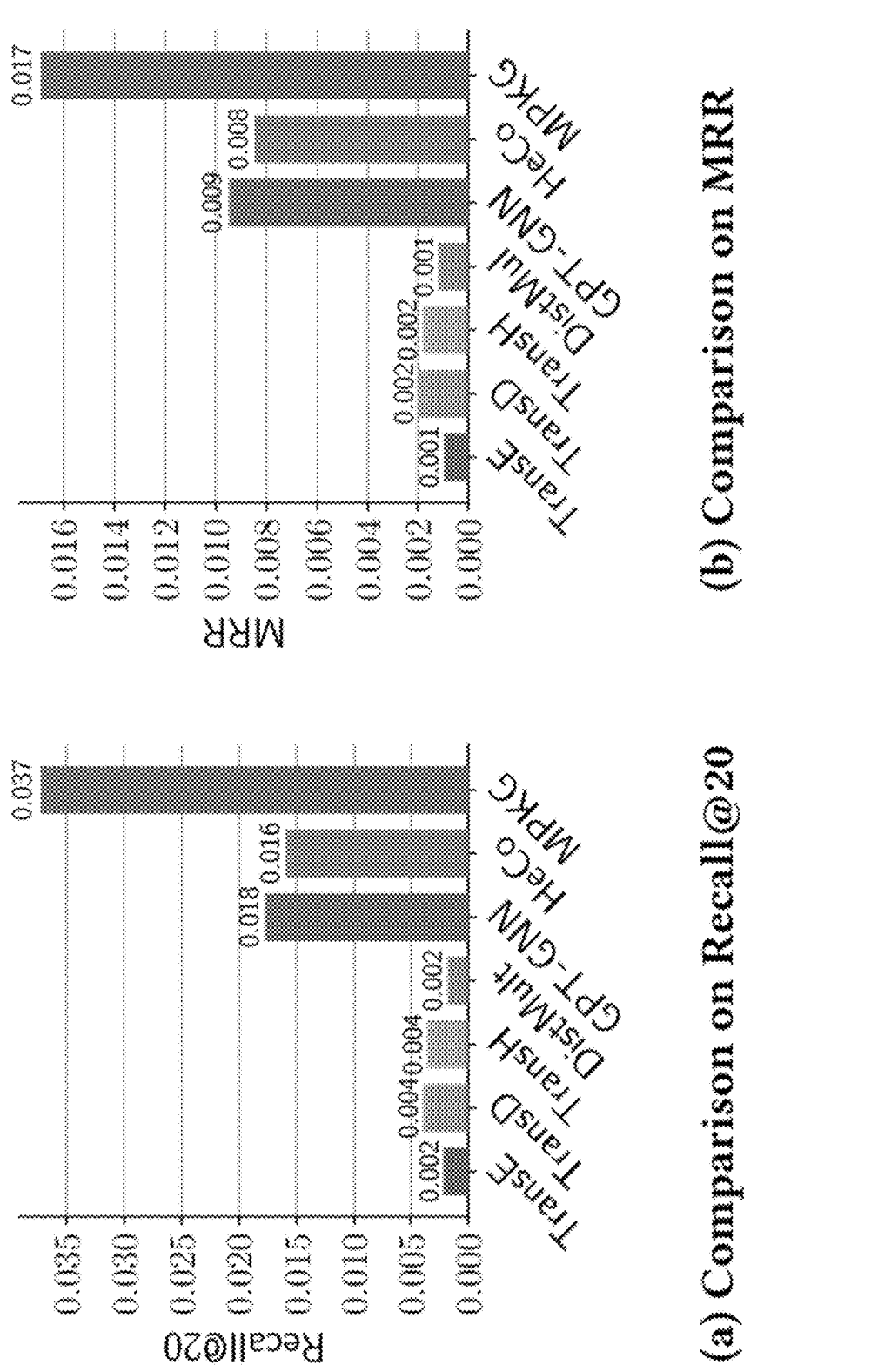

The knowledge prediction task is further conducted on zero-shot items. The zero-shot item embed-ding inference is corresponding to the inductive inference as in FIG. 4 but without the fine-tuning step. The performance is shown in FIG. 13. Recall@20 and MRR are shown in in FIG. (13a) and FIG. (13b), respectively. Zero-shot items evaluation verifies the induction capability of models and demonstrates the extent to which item embeddings generation can extend to zero-shot items.

The proposed model still achieves the best zero-shot item knowledge prediction performances in all metrics, with improvements from 88.9% to 105.6% over the best baseline model. The superiority in knowledge prediction performances demonstrates the effectiveness of the proposed model in generalizing to zero-shot items.

Among the two categories of baselines approaches, pretraining methods based on heterogeneous GNN still achieve more satisfactory item embeddings learning than triplet-based methods. It further demonstrates the necessity of GNN in generalizing item embeddings learning.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A system for pretraining a multi-task model to generate universal item embeddings, the system comprising:
   a data interface that receives information relating to a plurality of items and user-item interactions;
   a memory storing a product knowledge graph representing item-item relations derived from the user-item interactions, and a plurality of processor-executable instructions; and
   one or more processors executing the instructions to perform operations including:
      encoding, by a graph encoder, at least a portion of the product knowledge graph corresponding to the plurality of items into a plurality of item relational embeddings;
      generating, by a respective task-oriented adaptation layer, a respective pretraining output based on the plurality of item relational embeddings;
      computing a respective pretraining objective based on the respective pretraining output and the at least portion of the product knowledge graph, wherein the respective pretraining objective is computed by computing a knowledge reconstruction score based on item-relational embeddings corresponding to a triplet of a first item, a second item and a specific relation between the first item and the second item and computing a cross-entropy loss based on knowledge reconstruction scores computed from positive triplets and negative triplets;
      updating at least the graph encoder based on multiple pretraining objectives via backpropagation;
      generating, by the updated graph encoder and at least one task-oriented adaptation layer, predicted ranking scores between the plurality of items and a set of users based on the product knowledge graph;
      computing a Bayesian ranking loss based on the ranking scores; and
      finetuning the at least one task-oriented adaptation layer based on the Bayesian ranking loss while keeping the updated graph encoder frozen.

2. The system of claim 1, wherein the product knowledge graph comprises a plurality of nodes representing the plurality of items, and a plurality of edges connecting the plurality of nodes and representing item-item connections among the plurality of items, and
   wherein the product knowledge graph is constructed based on the information relating to the plurality of items and user-item interactions by:
      extracting, by a pretrained language model, item feature embeddings from the information relating to the plurality of items; and
      deriving, by the pretrained language model, the item-item connections from collected feedback from the user-item interactions relating to the plurality of items.

3. The system of claim 1, wherein the operation of generating, by the respective task-oriented adaptation layer, the respective pretraining output comprises:
   adapting the plurality of item relational embeddings to a respective task; and
   fusing the adapted plurality of item relational embeddings.

4. The system of claim 1, wherein the respective pretraining objective is computed by:
   concatenating, for each item, item-relational embeddings corresponding to the respective item, into a respective item embedding;
   computing a neighbor reconstruction score between a first item and a second item based on a first item embedding and a second item embedding; and
   computing a cross-entropy loss based on neighbor reconstruction scores between pairs of items that are within a pre-defined number hops from each other.

5. The system of claim 1, wherein the respective pretraining objective is computed by:
   concatenating the plurality of item-relational embeddings into a concatenated relational embedding;
   generating, by a decoder, a decoded feature from the concatenated relational embedding; and
   computing a feature reconstruction loss based on a distance between the decoded feature and original encoded item features.

6. The system of claim 1, wherein the respective pretraining objective is computed by:
   computing, for each respective item, a weighted sum of the plurality of item-relational embeddings corresponding to the respective item into a respective item embedding;

computing a prediction score between a first item embedding corresponding to a first item and a second item embedding corresponding to a second item; and computing a cross-entropy loss based on first prediction scores between pairs of items that are connected according to a specific relation and second prediction scores between pairs of items that are not connected according to the specific relation.

7. The system of claim 1, wherein the graph encoder is updated based on a weighted sum of the multiple pretraining objectives.

8. The system of claim 1, wherein the predicted ranking scores are generated by:

computing, for a first item, a weighted sum of the plurality of item-relational embeddings corresponding to the first item into a first item embedding;

computing, for a first user, a mean aggregation of all iterated items by averaging item embeddings corresponding to items that the first user has interacted with; and computing the predicted ranking score between the first user and the first item based on a similarity between the mean aggregation and the first item embedding.

9. The system of claim 1, wherein the Bayesian ranking loss is computed based a first predicted ranking score corresponding to a first user and a first item that interacted with each other, and a second predicted ranking score corresponding to a first user and a second item that do not interact with each other.

10. The system of claim 1, wherein the operations further comprise:

updating the product knowledge graph with a new item and a set of relations between the new item and the plurality of items;

generating, by the updated graph encoder and the finetuned at least one task-oriented adaptation layer, an item embedding for the new item, wherein the item embedding comprises knowledge for a recommendation task deciding whether to recommend the new item for a specific user.

11. A method for pretraining a multi-task model to generate universal item embeddings, the method comprising:

receiving, via a data interface, information relating to a plurality of items and user-item interactions;

obtaining a product knowledge graph representing item-item relations derived from the user-item interactions;

encoding, by a graph encoder, at least a portion of the product knowledge graph corresponding to the plurality of items into a plurality of item relational embeddings;

generating, by a respective task-oriented adaptation layer, a respective pretraining output based on the plurality of item relational embeddings;

computing a respective pretraining objective based on the respective pretraining output and the at least portion of the product knowledge graph, wherein the respective pretraining objective is computed by computing a knowledge reconstruction score based on item-relational embeddings corresponding to a triplet of a first item, a second item and a specific relation between the first item and the second item and computing a cross-entropy loss based on knowledge reconstruction scores computed from positive triplets and negative triplets;

updating at least the graph encoder based on multiple pretraining objectives via backpropagation;

generating, by the updated graph encoder and at least one task-oriented adaptation layer, predicted ranking scores between the plurality of items and a set of users based on the product knowledge graph;

computing a Bayesian ranking loss based on the ranking scores; and finetuning the at least one task-oriented adaptation layer based on the Bayesian ranking loss while keeping the updated graph encoder frozen.

12. The method of claim 11, wherein the product knowledge graph comprises a plurality of nodes representing the plurality of items, and a plurality of edges connecting the plurality of nodes and representing item-item connections among the plurality of items, and wherein the product knowledge graph is constructed based on the information relating to the plurality of items and user-item interactions by:

extracting, by a pretrained language model, item feature embeddings from the information relating to the plurality of items; and deriving, by the pretrained language model, the item-item connections from collected feedback from the user-item interactions relating to the plurality of items.

13. The method of claim 11, wherein the operation of generating, by the respective task-oriented adaptation layer, the respective pretraining output comprises:

adapting the plurality of item relational embeddings to a respective task; and fusing the adapted plurality of item relational embeddings.

14. The method of claim 11, wherein the respective pretraining objective is computed by:

concatenating, for each item, item-relational embeddings corresponding to the respective item, into a respective item embedding;

computing a neighbor reconstruction score between a first item and a second item based on a first item embedding and a second item embedding; and computing a cross-entropy loss based on neighbor reconstruction scores between pairs of items that are within a pre-defined number hops from each other.

15. The method of claim 11, wherein the respective pretraining objective is computed by:

concatenating the plurality of item-relational embeddings into a concatenated relational embedding;

generating, by a decoder, a decoded feature from the concatenated relational embedding; and computing a feature reconstruction loss based on a distance between the decoded feature and original encoded item features.

16. The method of claim 11, wherein the respective pretraining objective is computed by:

computing, for each respective item, a weighted sum of the plurality of item-relational embeddings corresponding to the respective item into a respective item embedding;

computing a prediction score between a first item embedding corresponding to a first item and a second item embedding corresponding to a second item; and computing a cross-entropy loss based on first prediction scores between pairs of items that are connected according to a specific relation and second prediction scores between pairs of items that are not connected according to the specific relation.

17. The method of claim 11, wherein the graph encoder is updated based on a weighted sum of the multiple pretraining objectives.

18. A non-transitory machine-readable medium comprising a plurality of machine-executable instructions which, when executed by one or more processors, are adapted to cause the one or more processors to perform operations comprising:

receiving, via a data interface, information relating to a plurality of items and user-item interactions;

obtaining a product knowledge graph representing item-item relations derived from the user-item interactions;

encoding, by a graph encoder, at least a portion of the product knowledge graph corresponding to the plurality of items into a plurality of item relational embeddings;

generating, by a respective task-oriented adaptation layer, a respective pretraining output based on the plurality of item relational embeddings;

computing a respective pretraining objective based on the respective pretraining output and the at least portion of the product knowledge graph, wherein the respective pretraining objective is computed by computing a knowledge reconstruction score based on item-relational embeddings corresponding to a triplet of a first item, a second item and a specific relation between the first item and the second item and computing a cross-entropy loss based on knowledge reconstruction scores computed from positive triplets and negative triplets;

updating at least the graph encoder based on multiple pretraining objectives via backpropagation;

generating, by the updated graph encoder and at least one task-oriented adaptation layer, predicted ranking scores between the plurality of items and a set of users based on the product knowledge graph;

computing a Bayesian ranking loss based on the ranking scores; and finetuning the at least one task-oriented adaptation layer based on the Bayesian ranking loss while keeping the updated graph encoder frozen.

19. The non-transitory machine-readable medium of claim 18, wherein the product knowledge graph comprises a plurality of nodes representing the plurality of items, and a plurality of edges connecting the plurality of nodes and representing item-item connections among the plurality of items, and wherein the product knowledge graph is constructed based on the information relating to the plurality of items and user-item interactions by:

extracting, by a pretrained language model, item feature embeddings from the information relating to the plurality of items; and deriving, by the pretrained language model, the item-item connections from collected feedback from the user-item interactions relating to the plurality of items.

20. The non-transitory machine-readable medium of claim 18, wherein the operation of generating, by the respective task-oriented adaptation layer, the respective pretraining output comprises:

adapting the plurality of item relational embeddings to a respective task; and fusing the adapted plurality of item relational embeddings.

\*  \*  \*  \*  \*